United States Patent [19]

Henrick et al.

[11] 3,864,376

[45] Feb. 4, 1975

[54] CYCLOPROPYLMETHYL CARBONATES

[75] Inventors: Clive A. Henrick; Gerardus B. Staal, both of Palo Alto, Calif.

[73] Assignee: Zoecon Corporation, Palo Alto, Calif.

[22] Filed: Apr. 30, 1973

[21] Appl. No.: 355,845

[52] U.S. Cl......... 260/463, 260/455 B, 260/609 D, 260/648 R, 424/301
[51] Int. Cl... C07c 69/00, C07c 154/00, A01n 9/24
[58] Field of Search .......................... 260/463, 455 B

[56] References Cited
UNITED STATES PATENTS
3,314,856   4/1967   Allais et al...................... 260/463 X
3,514,504   5/1970   Peterson............................. 260/958

OTHER PUBLICATIONS

Chemical Abstracts, Vol. 41, 4456a(1947).

*Primary Examiner*—Lewis Gotts
*Assistant Examiner*—Diana G. Rivers
*Attorney, Agent, or Firm*—Lee-Louise H. Priest; Donald W. Erickson

[57] ABSTRACT

Organic compounds characterized by a cyclopropylmethyl moiety, synthesis thereof, and compositions thereof for the control of mites.

6 Claims, No Drawings

CYCLOPROPYLMETHYL CARBONATES

This invention related to novel compounds, synthesis thereof, compositions thereof and the control of mites.

The compounds of the present invention are effective for the control of spider mites. Spider mites are plant feeders and cause serious damage to orchard trees, field crops, greenhouse plants and other vegetation. They feed on the foliage or fruit of plants and trees and attack a variety of plants and trees due to their wide distribution. The family Tetranychidae, such as *Tetranychus urticae, Tetranychus atlanticus, Tetranychus bioculatus, Tetranychus canadensis, Tetranychus cinnabarinus, Tetranychus pacificus* and similar related species, are of particular biological interest and economic importance.

Compounds of the present invention of the following formulae A and B are effective control agents for mites.

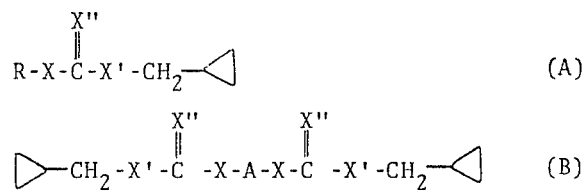

wherein

X, X', and X'' are independently oxygen or sulfur;
R is a monovalent organic radical; and
A is alkylene, alkenylene or alkynylene.

Hereinafter, each of X, X', X'', R and A is as defined above unless otherwise specified.

The compounds of Formulae A and B are applied to the mite at any stage, namely, during the egg, larvae, nymphal or adult stages in view of their effect in causing abnormal development leading to death, inability to pass from one stage to the next, or inability to reproduce. A compound of the formula A or B, or mixtures thereof, can be applied at dosage levels of the order of 0.001% to 1%. Suitable carrier substances include liquid or solid inert carriers, such as water, acetone, xylene, mineral or vegetable oils, talc, vermiculite, and silica. Treatment of mites in accordance with the present invention can be accomplished by spraying, dusting, or otherwise contacting the mites and/or their eggs or larvae directly or indirectly. Generally, a concentration of less than 25% of active compound is employed, although a higher concentration of the active compound can be used depending on the type of application apparatus. The formulations can include emulsifying agents and wetting agents to assist in the application and effectiveness of the active ingredient.

Typical compounds of formula A are those wherein R is alkyl, alkenyl, or alkynyl of 10 to 20 carbon atoms, alkylcyclopropane wherein the alkyl portion contains one to four carbon atoms, aryl, or aralkyl.

Typical compounds of formula B are those wherein A is alkylene of one to 20 carbon atoms, or alkenylene or alkynylene or two to 20 carbon atoms.

Preferred compounds of Formulae A and B having particularly good activity for the control of mites are those wherein X, X', and X'' are all oxygen, R is alkyl of 10 to 16 carbon atoms or aryl or aralkyl of six to 10 carbon atoms, and A contains from two to 10 carbon atoms.

Particularly preferred compounds of formulae A and B having very good activity for the control of mites are those wherein X, X', and X'' are oxygen, R is dodecyl, phenyl or benzyl, and A is ethylene.

Compounds of formula A can be prepared by the reaction of a haloformate or a derivative thereof of the formula

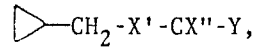

where Y is chlorine or bromine, with an alcohol or mercaptan of the formula RXH or an alkali metal salt thereof. Alternatively, the compounds can be prepared by the reaction of a haloformate of the formula R—X—CX''—Y with cyclopropylmethyl alcohol or cyclopropylmethyl mercaptan or an alkali metal salt thereof. Pyridine can be added if desired.

Similarly, compounds of formula B are prepared by the reaction of at least two equivalents of a haloformate or a derivative thereof of the formula

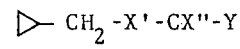

with a compound of the formula HX-A-XH or an alkali metal salt thereof. Alternatively, the compounds can be prepared by the reaction of R—X—CX''—Y with

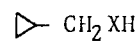

or an alkali metal salt thereof.

Cyclopropylmethyl alcohol can be prepared as described by Sarel and Newman, *J. Am. Chem. Soc.* 78, 5416 (1956); Sneen et al, bid, 83, 4843 (1961); Siegel and Bergstron, ibid, 72, 3815 (1950) and 74, 145 (1953); U.S. Pat. Nos. 2,494,084 and 3,074,984; and references cited therein.

Cyclopropylmethyl mercaptan can be prepared by treating cyclopropylmethyl chloride or bromide with a slight molar excess sodium hydrosulfide in dimethylformamide solvent with cooling to maintain the reaction at room temperature. The reaction proceeds to completion in about one to four hours.

Cyclopropylmethyl halides can be prepared by treating cyclopropylmethyl alcohol with an aromatic or aliphatic sulfonyl chloride, such as mesyl chloride or tosyl chloride, in pyridine solvent at 0°–10° C. The corresponding cyclopropylmethyl sulfonate thus formed is then treated with lithium bromide or lithium chloride in a solvent such as acetone to yield the corresponding cyclopropylmethyl chloride or bromide.

Cyclopropylmethyl chloride can also be prepared by treating cyclopropylmethyl alcohol with thionyl chloride according to the procedure described by Caserio et al., Tetrahedron, 11, 171 (1960).

Compounds of the formulae

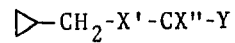

and R—X—CX''—Y are conveniently prepared by reacting phosgene or thiophosgene with an alcohol or mercaptan of the formula R-XH or

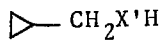

or an alkali metal salt thereof in the presence of a tertiary amine such as quinoline, at 0°–15° C, in a solvent inert to the reaction such as benzene, toluene, ether, and the like.

Although in the practice of the present invention no limitation need be placed on the chain length in the case of R when it represents an acyclic monovalent organic radical, the organic radical will usually have a chain length of five to 30 carbon atoms, which can be saturated or unsaturated and branched or straight chain. The radical can contain one or more hetero atoms in the chain, such as oxygen, sulfur or nitrogen. The acyclic organic radical can be substituted with one or more hetero atoms, such as hydroxy, halogen atom, alkoxy, amino or alkylthio. The organic radical R can be carbocyclic of from three to ten carbon atoms, such as cyclopropyl, cyclobutyl, cyclopentyl, cyclopentenyl, cyclohexyl, cyclohexadienyl, cycloheptyl, cycloheptatrienyl, cyclooctyl, and the like. The organic radical R can also be an aryl or alkaryl group of from six to about 15 carbon atoms.

The term "alkyl", as used herein, refers to a straight or branched chain saturated aliphatic hydrocarbon group, e.g., methyl, ethyl, propyl, i-propyl, n-butyl, s-butyl, t-butyl, pentyl, hexyl, octyl, 2-methyloctyl, nonyl, decyl, undecyl, 2-methylundecyl, 6-methylundecyl, dodecyl, pentadecyl and the like.

The term "alkenyl" as used herein refers to a straight or branched chain unsaturated carbon chain having one to three sites of olefinic unsaturation.

The term "alkynyl" as used herein refers to a straight or branched chain unsaturated carbon chain having one or two sites of acetylenic unsaturation.

The term "alkoxy" as used herein refers to methoxy, ethoxy, n-propoxy, i-propoxy, n-butoxy, i-butoxy, s-butyoxy, and t-butoxy.

The term "alkylene" refers to the bivalent alkylene moiety, including branched-chain alkylene, or one to 20 carbon atoms.

The term "alkenylene" refers to the bivalent alkenylene moiety, including branched-chain alkenylene, of two to 20 carbon atoms.

The term "alkynylene" refers to the bivalent alkynylene moiety, including branched-chain alkynylene, of two to 20 carbon atoms.

The term "aralkyl" as used herein refers to a monovalent hydrocarbon group in which a hydrogen atom of an alkyl group having a chain length of one to six carbon atoms is substituted by an aryl group, such as benzyl, phenethyl, methylbenzyl, naphthylmethyl and naphthylethyl containing from seven to 15 carbon atoms.

The term "aryl" as used herein refers to a monovalent aromatic hydrocarbon group containing from six to 14 carbon atoms such as phenyl, tolyl, xylyl, mesityl, naphthyl, ethylphenyl, t-butylphenyl and isopropylphenyl.

The following examples are provided to illustrate the syntheses of the compounds of the present invention and the practice of the present invention. Temperature is reported in degrees Centigrade.

EXAMPLE 1

To a solution of 5 g. of para-t-butylphenylchloroformate in 100 ml. ether and 4 g. of pyridine is added 1.8 g. of cyclopropanemethyl alcohol. The reaction mixture is stirred overnight and then diluted with water, washed with dilute aqueous hydrochloric acid, water, sodium bicarbonate, and brine. The mixture is then dried over calcium sulfate and the solvent evaporated to yield O-p-t-butylphenyl O'-cyclopropylmethyl carbonate, b.p. 100°–104° at 0.025 mm.

EXAMPLE 2

To a stirred solution of 3.43 g. of benzylchloroformate in cyclohexane, under nitrogen, is added 4.32 g. of cyclopropanemethyl alcohol. The reaction mixture is stirred for 2 days and then diluted with water. The solution is extracted with ether, washed with dilute sodium hydroxide, dilute aqueous hydrochloric acid, dilute aqueous sodium bicarbonate, water, and brine and then separated to yield O-benzyl-O'-cyclopropylmethyl carbonate, b.p. 70° at 5 mm.

Using the procedure of Example 2, each of phenol, p-cresol, phenylmethylcarbinol p-ethylphenol, β-phenylethanol, 2, 3, 6-trimethylphenol, β-naphthol, p-isopropylbenzyl alcohol, methyl-α-naphthylcarbinol, and 2-phenylbenzyl alcohol is reacted with cyclopropylmethyl chloroformate to yield respectively:
phenyl cyclopropylmethyl carbonate
p-cresyl cyclopropylmethyl carbonate
α-phenylethyl cyclopropylmethyl carbonate
p-ethylphenyl cyclopropylmethyl carbonate
β-phenylethyl cyclopropylmethyl carbonate
2,3,6-trimethylphenyl cyclopropylmethyl carbonate
β-naphthyl cyclopropylmethyl carbonate
p-isopropylbenzyl cyclopropylmethyl carbonate
methyl-α-naphthylmethyl cyclopropylmethyl carbonate
2-phenylbenzyl cyclopropylmethyl carbonate Similarly, each of cyclopropanol, cyclopropylmethanol, cyclopentanol, cyclohexanol, 3-methylcyclopentanol, cycloheptanol, isopropylcyclohexanol and α-decalol is reacted with cyclopropyl methyl chloroformate to yield respectively:
cyclopropyl cyclopropylmethyl carbonate
di (cyclopropylmethyl) carbonate
cyclopentyl cyclopropylmethyl carbonate
cyclohexyl cyclopropylmethyl carbonate
cyclohexyl cyclopropylmethyl carbonate
3-methylcyclopentyl cyclopropylmethyl carbonate
cycloheptyl cyclopropylmethyl carbonate
isopropylcyclohexyl cyclopropylmethyl carbonate
α-decalyl cyclopropylmethyl carbonate Using the procedure of Example 2, each of phenyl mercaptan, benzyl mercaptan, p-isopropylphenyl mercaptan, naphthyl mercaptan, cyclopropyl mercaptan, cyclobutyl mercaptan, and cyclohexyl mercaptan were reacted with cyclopropylmethyl chloroformate to yield respectively:
S-phenyl O-cyclopropylmethyl thiocarbonate
S-benzyl O-cyclopropylmethyl thiocarbonate
S-p-isopropylphenyl O-cyclopropylmethyl thiocarbonate
S-naphthyl O-cyclopropylmethyl thiocarbonate
S-cyclopropyl O-cyclopropylmethyl thiocarbonate
S-cyclobutyl O-cyclopropylmethyl thiocarbonate
S-cyclohexyl O-cyclopropylmethyl thiocarbonate Using the procedure of Example 2, each of phenyl mercaptan, benzyl mercaptan, 1-phenyl-1-pentyl mercaptan, o-t-butylphenyl mercaptan, and 2-phenylbenzyl mercaptan is reacted with

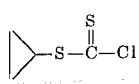

to yield respectively:
  phenyl cyclopropylmethyl trithiocarbonate
  benzyl cyclopropylmethyl trithiocarbonate
  1-phenyl-1-pentyl cyclopropylmethyl trithiocarbonate
  o-t-butylphenyl cyclopropylmethyl trithiocarbonate
  2-phenylbenzyl cyclopropylmethyl trithiocarbonate

EXAMPLE 3

To 20 ml. of a 12.5% solution of phosgene in benzene is added an additional 100 ml. of benzene. The solution is cooled to 0° under nitrogen. 5.9 g. of pyridine is added, followed by 1.8 g. of cyclopropylmethyl alcohol, and then 4.7 g. of n-dodecanol. The reaction mixture is stirred at room temperature for 14 days, washed with water, dilute hydrochloric acid, water, dilute sodium bicarbonate, water, cupric sulfate, water, and brine, and then distilled to yield O-dodecyl-O'-cyclopropylmethyl carbonate, b.p. 135° (bath) at 0.05 mm.

Using the procedure of Example 3, each of 1-decanol 1-tetradecanol, 3,7-dimethyldodecan-1-ol, 1-tetradecanol 3-ethyltetradecan-1-ol, 1-hexadecanol, 1-octadecanol, oleyl alcohol, linoleyl alcohol, linolenyl alcohol, eleostearyl alcohol, ricinoleyl alcohol, petroselenyl alcohol, vaccenyl alcohol, erucyl alcohol, tariryl alcohol and erythrogenyl alcohol is reacted with cyclopropyl chloroformate to yield respectively:
  decyl cyclopropylmethyl carbonate
  3,7-dimethyldodecyl cyclopropylmethyl carbonate
  tetradecyl cyclopropylmethyl carbonate
  3-ethyltetradecyl cyclopropylmethyl carbonate
  1-hexadecyl cyclopropylmethyl carbonate
  oleyl cyclopropylmethyl carbonate
  linoleyl cyclopropylmethyl carbonate
  linolenyl cyclopropylmethyl carbonate
  eleostearyl cyclopropylmethyl carbonate
  ricinoleyl cyclopropylmethyl carbonate
  petroselenyl cyclopropylmethyl carbonate
  vaccenic cyclopropylmethyl carbonate
  erucyl cyclopropylmethyl carbonate
  tariryl cyclopropylmethyl carbonate
  erythrogenyl cyclopropylmethyl carbonate

EXAMPLE 4

To 3.10 g. of ethylene 1,2-bis (chloroformate) in 100 ml. of cyclohexane, under nitrogen, is added 1 ml. of pyridine. After stirring for one-half hour, 4.32 grams of cyclopropylmethyl alcohol is added. The reaction mixture is stirred for 2 days, washed with water, dilute hydrochloric acid, water, dilute sodium bicarbonate, water, cupric sulfate, water, and brine and the solvent removed to yield ethylene 1,2-bis-cyclopropylmethyl carbonate.

Using the procedure of Example 4, each of methylene 1,1-bis (chloroformate), ethenylene 1,2-bis-chloroformate, propylene bis-1,3-chloroformate, butylene bis-1,4-chloroformate, 2-methylpentylene bis-1,5-chloroformate, 2,2-dimethylbutylene 1,4-bis-chloroformate, n-octylene 1,8-bis-chloroformate, 2,4-dimethylheptylene 1,7-bis-chloroformate, n-decyl-1,10-bis-chloroformate, propenylene-1,3-bis-chloroformate, butenylene-1,4-bis-chloroformate, 2-methylbut-1-enylene, 1,4-bis-chloroformate, 4-methyl-2-octenylene-1,8-bis-chloroformate, 1,3-pentadienylene-1,5-bis chloroformate, 4,5-dimethyl-2,6-octadienylene-1,8-bis-chloroformate, 2,5-dimethylhexatrienylene-1,6-bis-chloroformate, propynylene-1,3-bis-chloroformate, 2,4-hexadiynylene-1,6-bis-chloroformate, and 1-heptynylene-1,7-bis-chloroformate is reacted with cyclopropylmethyl alcohol to yield:
  methylene 1,1-bis-cyclopropylmethyl carbonate
  ethenylene 1,2-bis-cyclopropylmethyl carbonate
  propylene 1,3-bis-cyclopropylmethyl carbonate
  butylene 1,4-bis-cyclopropylmethyl carbonate
  2-methylpentylene 1,5-bis-cyclopropylmethyl carbonate
  2,2-dimethylbutylene 1,4-bis-cyclopropylmethyl carbonate
  n-octylene 1,8-bis-cyclopropylmethyl carbonate
  2,4-dimethylheptylene 1,7-bis-cyclopropylmethyl carbonate
  n-decylene 1,10-bis-cyclopropylmethyl carbonate
  propenylene 1,3-bis-cyclopropylmethyl carbonate
  butenylene 1,4-bis-cyclopropylmethyl carbonate
  2-methylbut-1-enylene 1,4-bis-cyclopropylmethyl carbonate
  4-methyl-2-octenylen 1,8-bis-cyclopropylmethyl carbonate
  1,3-pentadienylene 1,5-bis-cyclopropylmethyl carbonate
  4,5-dimethyl-2,6-octadienylene 1,8-bis-cyclopropylmethyl carbonate
  2,5-dimethylhexatrienylene 1,6-bis-cyclopropylmethyl carbonate
  propynylene 1,3-bis-cyclopropylmethyl carbonate
  1-heptynylene 1,7-bis-cyclopropylmethyl carbonate The mite control agents of the present invention can be used alone in an inert agriculturally acceptable carrier substance for the control of mites (Arachnids) or can be used in mixture with insecticides and/or juvenile hormone analogs known in the art to provide a broader spectrum of activity.

The effectiveness of the compounds of the present invention is demonstrated below.

Adults (*Tetranychus urticae*) were allowed to oviposit for 24 hours on the underside of castor bean leaf discs (1 cm.) on moist cottonwool.

After 24 hours, the adults were removed and the leaf discs were then dipped in acetone solutions of the compounds of the stated concentration.

After submersion for 1 second, the solvent on the leaf discs is allowed to dry and the leaf discs are then glued to a plastic petri dish to prevent crumpling.

5 days later (when all the eggs on untreated discs have emerged), the number of unhatched eggs is calculated as a percentage of the total number originally present.

The following results were obtained:

| Compound | Concentration % compound | % Eggs unhatched |
| --- | --- | --- |
| Dodecyl cyclopropylmethyl carbonate | 0.1 | 88 |
| Phenyl cyclopropylmethyl carbonate | 0.1 | 82 |
| Benzyl cyclopropylmethyl carbonate | 0.1 | 70 |
| Ethylene 1,2-bis-cyclopropylmethyl carbonate | 0.1 | 60 |

What is claimed is:
1. A compound of the formula A

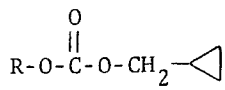 (A)

wherein,
R is alkyl of ten to 16 carbon atoms or aryl or aralkyl or six to 10 carbon atoms.

2. The compound, dodecyl cyclopropylmethyl carbonate, according to claim 1.

3. The compound, phenyl cyclopropylmethyl carbonate, according to claim 1.

4. The compound, benzyl cyclopropylmethyl carbonate, according to claim 1.

5. A compound of formula B

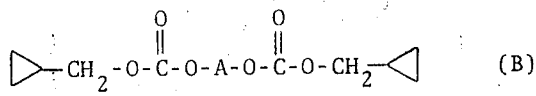 (B)

wherein,
A is alkylene, alkenylene or alkynylene of two to 10 carbon atoms.

6. The compound, ethylene 1,2-bis-cyclopropylmethyl carbonate, according to claim 5.